No. 844,816. PATENTED FEB. 19, 1907.
J. E. LEE.
MACHINE FOR BRUSHING BANDAGE ROLLS, &c.
APPLICATION FILED OCT. 28, 1904.
2 SHEETS—SHEET 1.
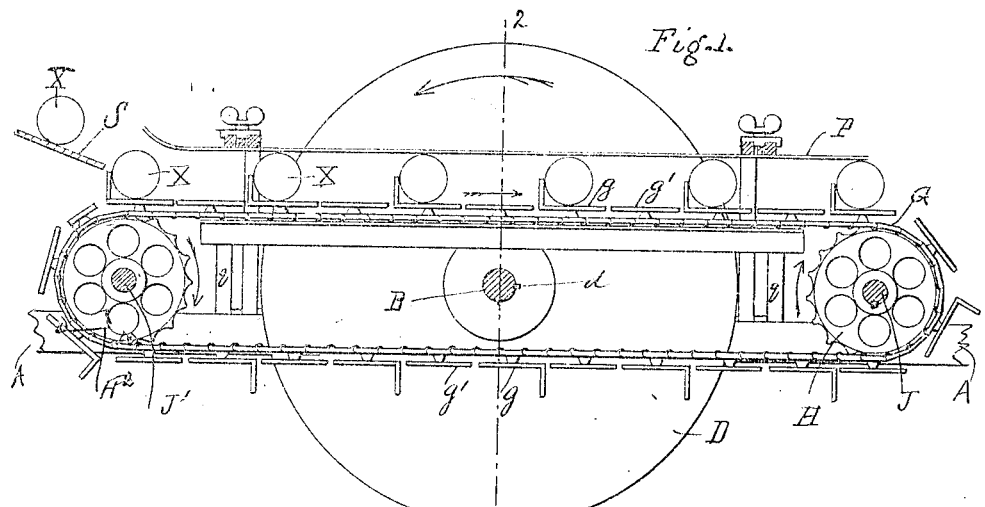
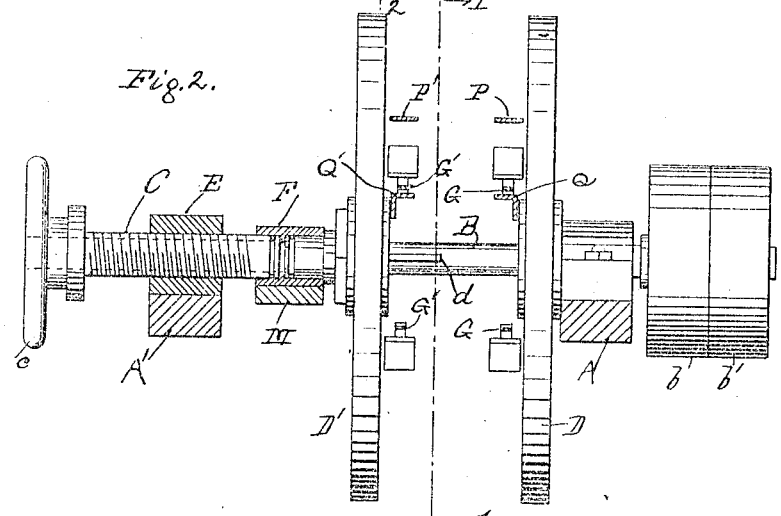
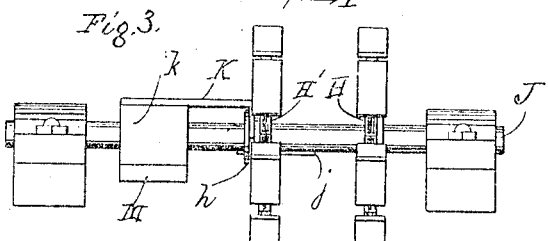
WITNESSES
INVENTOR
John Ellwood Lee
BY
Howson and Howson
ATTORNEYS

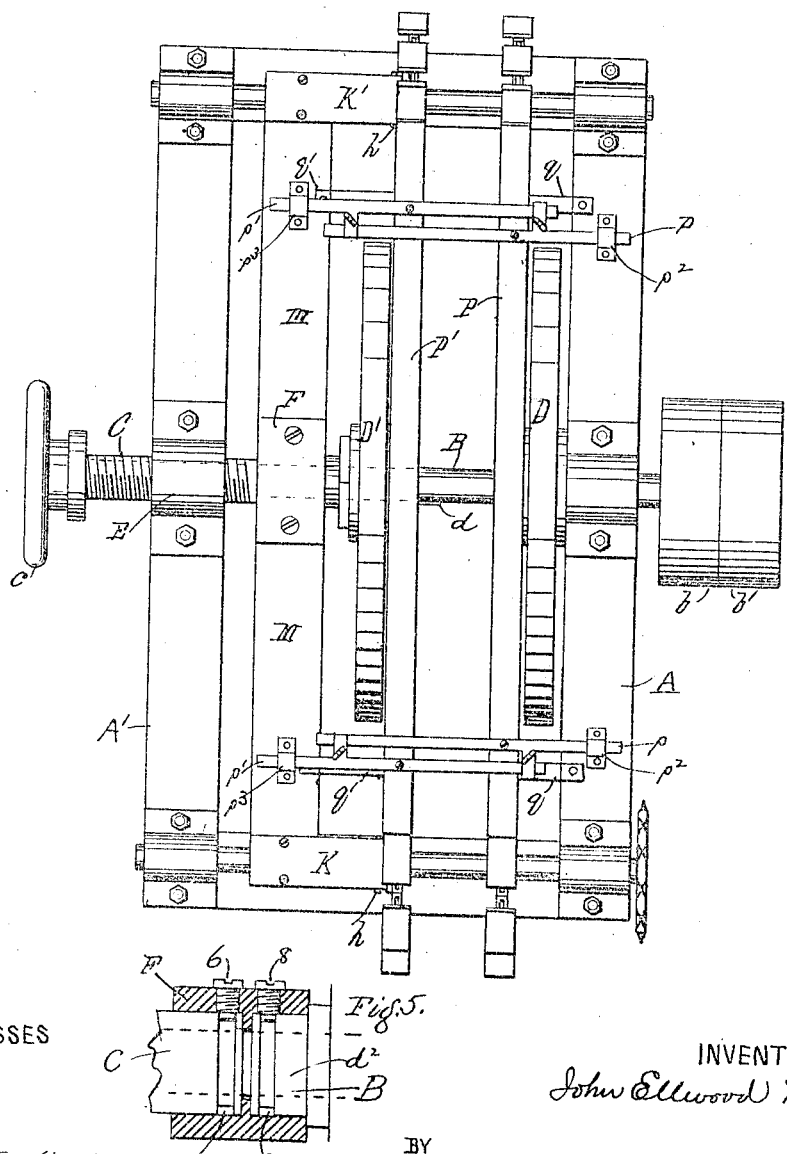

UNITED STATES PATENT OFFICE.

JOHN ELLWOOD LEE, OF CONSHOHOCKEN, PENNSYLVANIA, ASSIGNOR TO J. ELLWOOD LEE COMPANY, OF CONSHOHOCKEN, PENNSYLVANIA, A CORPORATION OF PENNSYLVANIA.

MACHINE FOR BRUSHING BANDAGE-ROLLS, &c.

No. 844,816.     Specification of Letters Patent.     Patented Feb. 19, 1907.

Application filed October 28, 1904. Serial No. 230,435.

*To all whom it may concern:*

Be it known that I, JOHN ELLWOOD LEE, a citizen of the United States of America, residing in Conshohocken, in the county of Montgomery, State of Pennsylvania, have invented an Improved Machine for Brushing Bandage-Rolls, &c., of which the following is a specification.

My invention consists of a machine which has been more particularly designed to facilitate the brushing out of the ravelings of rolls of bandages in carrying out the method of making bandages forming the subject of my Patent No. 761,513, dated May 31, 1904; but it will be understood that my improvements are applicable to other uses.

In the accompanying drawings, Figure 1 is a longitudinal section of my machine on the line 1 1, Fig. 2. Fig. 2 is a transverse section on the line 2 2, Fig. 1. Fig. 3 is an end view of the conveyer. Fig. 4 is a plan view of the machine, and Fig. 5 is an enlarged view of a detail.

A A' are the side frames of the machine, and B is the main shaft, which is provided with fast and loose pulleys $b$ $b$ and carries two brushing or abrading disks D D'. The disk D is fast upon the shaft, while the disk D' is connected to the shaft by a spline or key $d$, which permits the disk to be moved lengthwise of the shaft, but so that it must rotate with the latter. The left-hand end of the shaft B in Fig. 2 after passing through the hub of the disk D' enters a hollow sleeve C, in which the shaft turns as a bearing. (See dotted lines in Fig. 2.) This hollow sleeve C is externally threaded and is fitted in a correspondingly-threaded fixed block E on the side frame A'. The outer end of the sleeve C is provided with a hand-wheel $c$, while its inner end is connected to a block F, in which the end of the sleeve may turn, but which is so connected thereto (as by a pin 6 in the block entering an annular groove 7 in the sleeve, Fig. 5,) that the block F must accompany any lengthwise motion of the sleeve C. Similarly, the hub of the disk D' is so connected to the block F (as by means of a pin 8 entering an annular groove 9 in a prolongation $d^2$ of the hub, Fig. 5,) that movement of this block F, produced by the screwing in or out of the sleeve C, will cause adjustment of the disk D' lengthwise of the shaft B.

Between the two disks I provide ways for conducting across between the two disks the rolls of bandages or other articles in such a manner that both ends of each roll may be brushed simultaneously by the two revolving disks. By preference, as a part of such conducting ways I provide an endless conveyer to facilitate the traversing of the rolls across the faces of the disks. In the present instance the conveyer is shown as consisting of two endless link-belts G G', passing over pairs of chain-wheels H H' and H² H³, mounted upon shafts J J'. The wheel H is fast upon its shaft J, and the wheel H² may be fast upon its shaft J', while the wheel H' is mounted upon the shaft J with a spline $j$, so that the wheel may be moved lengthwise upon the shaft, but must revolve with the latter. The wheel H³ may be free upon the shaft J'. I provide means whereby the wheels H' and H³ may be adjusted lengthwise of their respective shafts simultaneously with the adjustment of the disk D', all for the purpose of adapting the machine for acting upon different lengths of rolls of bandages or other articles, as will be readily understood.

To enable the wheels H' and H³ and the chain passing over them to be adjusted with the disk D', I may provide each of these wheels H' H³ with a grooved collar $h$, into which fits the hooked and forked end of an arm K K', mounted on a block $k$ $k'$, on the end of a cross-bar M, affixed to the central block F, Figs. 2, 3, and 4.

The endless chains G G' carry plates $g$ $g'$, the plates $g$ having projecting wings, such that when cylindrical bandages are fed down through the chute S, Fig. 1, the wings will engage the bandages X and carry them forward across and in contact with the adjacent facts of the two revolving disks. Immediately over each chain at a suitable height, depending upon the diameter of the bandages or other articles which are traversed through between the disks, I arrange as part of the conducting-way guide-bars P P', the guide-bar P' being laterally adjustable with the corresponding chain of the conveyer. For this purpose the bar P has secured to it cross-bars $p$, Fig. 4, projecting over the bar P' into and slidable through guides on cross-bars $p'$, which are secured to the bar P'. These bars $p$ are supported upon posts $p^2$ on the side frame A. The bars $p'$ extend over the bar P and are in turn slidable in guides on the cross-bars $p$ and are supported on posts $p^3$ on the cross-bar M.

Underneath the upper reach of each chain G, I prefer to provide a supporting-bar Q Q', Figs. 1 and 2. The supporting-bar Q may be fixedly mounted on brackets $q$ on the side frame A of the machine, while the bar Q' may be supported from the cross-bar M by brackets $q'$ or in any other suitable way, Fig. 4.

I claim as my invention—

1. The combination of a pair of rotating disks with a pair of laterally-adjustable endless conveyer chains between the disks and means for adjusting the disks and chains toward and from each other.

2. The combination of a pair of rotating disks with a pair of laterally-adjustable endless conveyer-chains traversing the space between the disks, a pair of guide-bars over the chains, and means for adjusting the disks, chains, and guide-bars toward and from each other.

In testimony whereof I have signed my name to this specification in the presence of two subscribing witnesses.

JOHN ELLWOOD LEE.

Witnesses:
M. E. WRIGHT,
A. A. BARR.